(12) United States Patent
Kogan et al.

(10) Patent No.: US 9,785,548 B2
(45) Date of Patent: Oct. 10, 2017

(54) HARDWARE EXTENSIONS FOR MEMORY RECLAMATION FOR CONCURRENT DATA STRUCTURES

(71) Applicant: Oracle International Corporation, Redwood City, CA (US)

(72) Inventors: Alex Kogan, Needham, MA (US); David Dice, Foxboro, MA (US); Maurice P. Herlihy, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 137 days.

(21) Appl. No.: 14/946,625

(22) Filed: Nov. 19, 2015

(65) Prior Publication Data

US 2017/0147487 A1    May 25, 2017

(51) Int. Cl.
| | | |
|---|---|---|
| G06F 12/02 | (2006.01) | |
| G06F 12/10 | (2016.01) | |
| G06F 9/50 | (2006.01) | |
| G06F 9/52 | (2006.01) | |
| G06F 12/1027 | (2016.01) | |

(52) U.S. Cl.
CPC ........ G06F 12/0253 (2013.01); G06F 9/5022 (2013.01); G06F 9/526 (2013.01); G06F 12/1027 (2013.01); G06F 2212/702 (2013.01)

(58) Field of Classification Search
None
See application file for complete search history.

(56) References Cited

U.S. PATENT DOCUMENTS

2004/0107227 A1*  6/2004  Michael ................ G06F 9/5016

OTHER PUBLICATIONS

Keir Fraser, "Practical lock-freedom", UCAM, Technical Report, No. 579, Feb. 2004, pp. 1-116.
Timothy L. Harris, "A Pragmatic Implementation of Non-Blocking Linked-Lists", 15th International Conference, DISC 2001, Oct. 2001, pp. 300-314.

(Continued)

*Primary Examiner* — Edward Dudek, Jr.
*Assistant Examiner* — Ralph A Verderamo, III
(74) *Attorney, Agent, or Firm* — Robert C. Kowert; Meyertons, Hood, Kivlin, Kowert & Goetzel, P.C.

(57) ABSTRACT

A hardware-assisted mechanism may improve the performance of memory reclamation operations that employ hazard pointers. The mechanism includes hazard lookaside buffers (HLBs), each implemented in hardware and locally accessible to one or more processor cores, and two new instructions. A special store instruction may write entries to local HLBs for pointers that have been or will be dereferenced but were not yet written to a shared hazard table (which requires memory barriers). Each entry may include a hazard pointer and a table address. A special test instruction may signal each HLB to determine whether it contains a particular pointer and, if so, to return a response. If the pointer does not reside in any HLB, the memory reclamation operation may search the hazard table for the pointer. If the pointer is found in an HLB or in the hazard table, the pointed-to memory location or memory block is not reclaimed.

20 Claims, 9 Drawing Sheets

(56) References Cited

OTHER PUBLICATIONS

Thomas E. Hart, et al., "Performance of memory reclamation for lockless synchronization", Journal of Parallel and Distributed Computing, 2007, pp. 1270-1285.

Steve Heller, et al., "A Lazy Concurrent List-Based Set Algorithm", OPODIS'05 Proceedings of the 9th international conference on Principles of Distributed Systems, 2005, pp. 3-16.

Maurice Herlihy, et al., "The Repeat Offender Problem: A Mechanism for Supporting Dynamic-Sized, Lock-Free Data Structures", DISC '02 Proceedings of the 16th International Conference on Distributed Computing, Oct. 28, 2002, pp. 339-353.

Maged M. Michael, "Hazard Pointers: Safe Memory Reclamation for Lock-Free Objects", IEEE Transactions on Parallel and Distributed Systems, vol. 15, No. 6, Jun. 2004, pp. 491-504.

\* cited by examiner

HARDWARE EXTENSIONS FOR MEMORY RECLAMATION FOR CONCURRENT DATA STRUCTURES

BACKGROUND

The widespread use of multicore platforms has produced a growing interest in the design and implementation of concurrent data structures that minimize the use of locks. These data structures (e.g., linked lists, skip lists, B-trees, queues, heaps, and hash maps) typically consist of a collection of nodes linked by pointers. Threads navigate through these links, adding nodes to or removing nodes from the structure. For example, using a so-called "lazy list" algorithm, threads traverse the data structure speculatively, without acquiring locks, then validate the target nodes (using locks or atomic operations) before making changes.

While lock-free navigation is typically more efficient than lock-based navigation, these data structures require more complex memory management because nodes unlinked from the data structure cannot be recycled right away. Instead, after a node is retired, that is, unlinked from the data structure, a grace period must elapse before that memory can be recycled. In managed languages, unused memory is reclaimed automatically by a garbage collector. For languages like C and C++, however, memory management is the explicit responsibility of the programmer.

Current memory reclamation mechanisms for concurrent data structures present an awkward trade-off, where either performance or robustness is sacrificed. For example, epoch-based reclamation performs well when all threads are running on dedicated processors, but the delay or failure of a single thread will prevent any other thread from reclaiming memory. On the other hand, more robust alternatives, such as the hazard pointers technique, are expensive because they require additional memory barriers. For example, on mainstream multicore architectures with a total-store ordering (TSO) memory model, the hazard pointer technique requires a store-load barrier after every store to a hazard pointer.

SUMMARY

In various embodiments of the systems described herein, a multithreaded, distributed, or concurrent application may take advantage of a hardware-assisted mechanism to improve the performance of memory reclamation operations that employ hazard pointers. The mechanism may include multiple hazard lookaside buffers (HLBs), each of which is implemented in hardware and is locally accessible to one or more processor cores. The HLBs may be configured to snoop on coherence traffic, and to keep track of hazardous pointers that may be in the store buffer. In some embodiments, the HLB may store a collection of entries, where each entry is a pair consisting of a hazard pointer and a table entry address. More specifically, each HLB entry may keep track of a hazard pointer that has not yet been written to memory and the address to which it will be written (e.g., the address of an entry in a shared hazard table in main memory).

In at least some embodiments, a special store instruction (hstore) may be called to create and store information about pointers that may be dereferenced but have not yet been written to a shared hazard table. This instruction may add an entry to the store buffer associated with the processor that issued the instruction and to the local HLB. Using the hstore instruction may allow the application to reduce or eliminate the expensive memory barriers that are typically required when writing to the shared hazard table in a convention hazard pointer implementation. In some embodiments, such memory barriers may not be required except under relatively rare conditions.

In at least some embodiments, a special test instruction (htest) called by a memory reclamation operation may query all of the HLBs to determine whether or not they store a particular pointer and, if so, to return a response. If, and only if, the pointer does not reside in any of the HLBs, the memory reclamation operation may search the shared hazard table for the pointer. If the pointer is found in one of the HLBs or in the shared hazard table, the pointed-to memory location or memory block cannot be reclaimed. However, if the pointer is not found in any one of the HLBs, nor in the shared hazard table, the pointed-to memory location or memory block may be reclaimed.

Figure 1A:
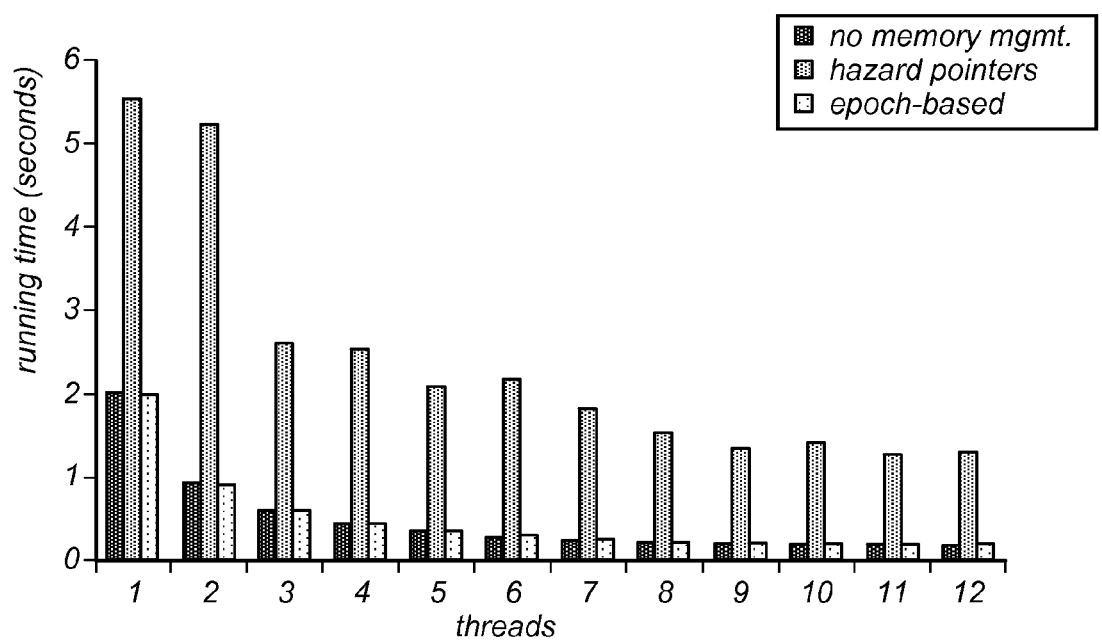
FIGS. 1A and 1B are graphs illustrating examples of the performance of lazy and lock-free list implementations, respectively, when different memory management approaches are applied.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, existing solutions for memory management with concurrent data structures, such as hazard pointers and epoch-based reclamation, have their advantages and disadvantages. For example, epoch-based reclamation is typically fast, but if even one thread is delayed, no memory can be reclaimed. Hazard pointers are much more robust, but they require the use of expensive memory fences. For example, when traversing all nodes on a linked list as part of a method that searches for a given one of them, a memory barrier would have to be issued after every access to a node in the memory region of interest.

The use of hazard pointers may be described in more detail by way of a specific example, illustrated in the pseudo-code below. When using hazard pointers, a thread publishes the address it is about to dereference to alert other threads that the grace period has not passed. The thread repeatedly reads the pointer (Line 3), stores it in the hazard table (Line 4), performs a memory barrier (Line 5), and rereads the pointer (Line 6). If the pointer in memory is unchanged, that pointer is returned. Otherwise, the loop resumes. The expensive part of this operation is the memory barrier. Once this procedure is complete, then as long as the hazard pointer is published in the hazard array, another thread that has retired that node will not de-allocate its memory, nor will it reinitialize and reuse that memory.

The example pseudo-code shown below illustrates how hazard pointers may be created, according to at least some embodiments.

```
1 Node* hazardRead(Node** object, Node* table) {
2     while (true) {
3         Node* read = *object;
4         *table = read;
5         membar( );
6         Node* reread = *object;
7         if (read == reread) {
8             return read;
9         }
10    }
11 }
```

In some systems that employ hazard pointers, a retired node is added to a thread-local list of retired nodes. As shown in the example pseudo-code below, in order to reclaim memory using hazard pointers, the thread iterates through its retired list, testing whether each pointer is present in the hazard table (Line 5). If not, it is safe to recycle the node.

```
1 void recycle ( ) {
2     Node* prev = retired ;
3     Node* curr = retired ->next;
4     while (curr != NULL) {
5         if (hazardTable->contains(curr)) {
6             curr = curr->next;   //hazardous, skip
7         } else {
8             prev->next = curr->next; // not hazardous, recycle
9             free (curr);
10            curr = prev->next;
11        }
12    }
13 }
```

As noted above, hazard pointers are expensive because memory barriers are expensive, and (using existing hazard pointer techniques) a thread traversing a structure must execute a memory barrier each time a new node is traversed, making common operations expensive. Hazard pointers, however, are robust: a failed or delayed thread may prevent certain nodes from being recycled, but will not prevent other threads from allocating, retiring, and recycling memory.

By contrast, in systems that employ epoch-based reclamation, threads execute in a succession of stages called epochs. Nodes retired during one epoch can be recycled as soon as all active threads have reached a sufficiently later epoch. Under normal circumstances, epoch-based reclamation is typically faster than hazard pointers because it requires fewer memory barriers, but it is not robust: if even a single thread is delayed, then epoch-based reclamation prevents every thread from recycling retired nodes.

To illustrate these effects, the performance of these memory management algorithms, as applied to two simple highly-concurrent list implementations, was compared. In a "lazy list" implementation, threads search through the list without acquiring locks. An operation that modifies the list locks the affected nodes, validates that they are correct, and then performs the modifications. By contrast, a lock-free list implementation replaces the lock acquisitions performed by the lazy list implementation with atomic compare-and-swap operations.

A synthetic benchmark was used to compare the lazy and lock-free list implementations. The machine on which the benchmark was run included a total of 8 GB of RAM shared across four cores, each having a 32 KB L1 cache. Hyperthreading was enabled, yielding a total of eight hardware threads. Threads were not pinned to cores. The list implementations were compared using the following settings. List values ranged from zero to 10,000, and the list was initialized to hold approximately half of those values. The number of threads varied from 1 to 12, and collectively they called 100,000 operations, which were divided equally among the threads. Each time a thread called an operation, it searched the list with 80% probability, and otherwise added or removed list elements with equal probability.

Figure 1B:
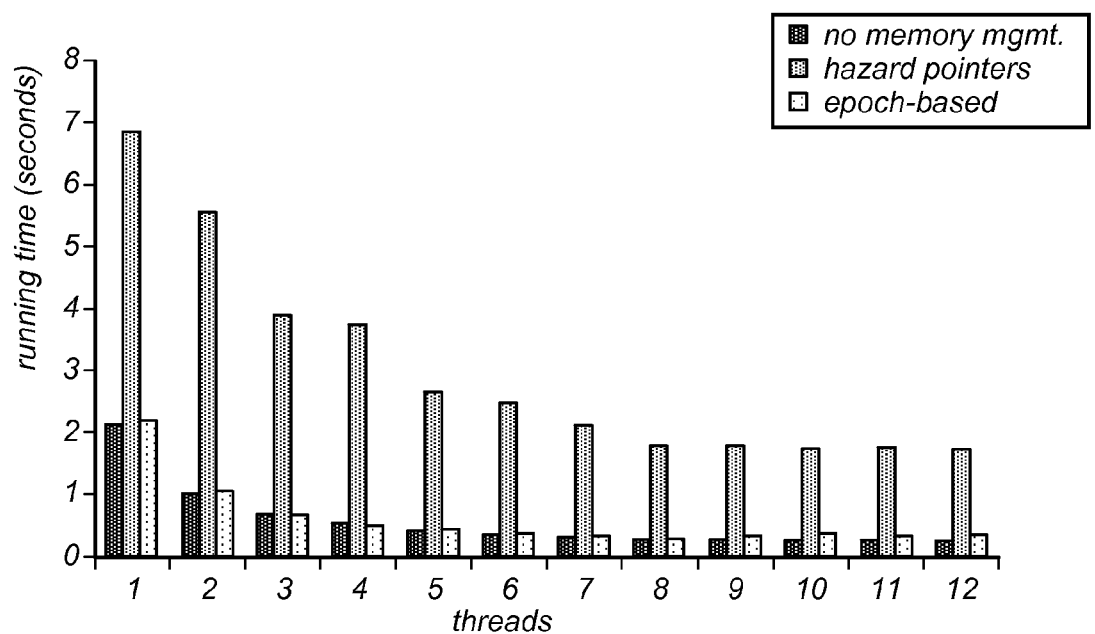

Using this benchmark, the performance of the lazy and lock-free list implementations was measured when varying memory management algorithms were applied, and the results are illustrated by the graphs in FIGS. 1A and 1B, respectively. In these graphs, the left-hand bar for a given number of threads represents the benchmark running time with no memory management, the middle bar for a given number of threads represents the benchmark running time when hazard pointers are used, and the right-hand bar for a given number of threads represents the benchmark running time with epoch-based memory management. These example results illustrate that the hazard pointer mechanism (which tolerates thread delays, as described above) is typically slower than the others. On the other hand, the epoch-based mechanism is usually faster, but is easily disrupted by delays such as cache misses.

Figure 2:
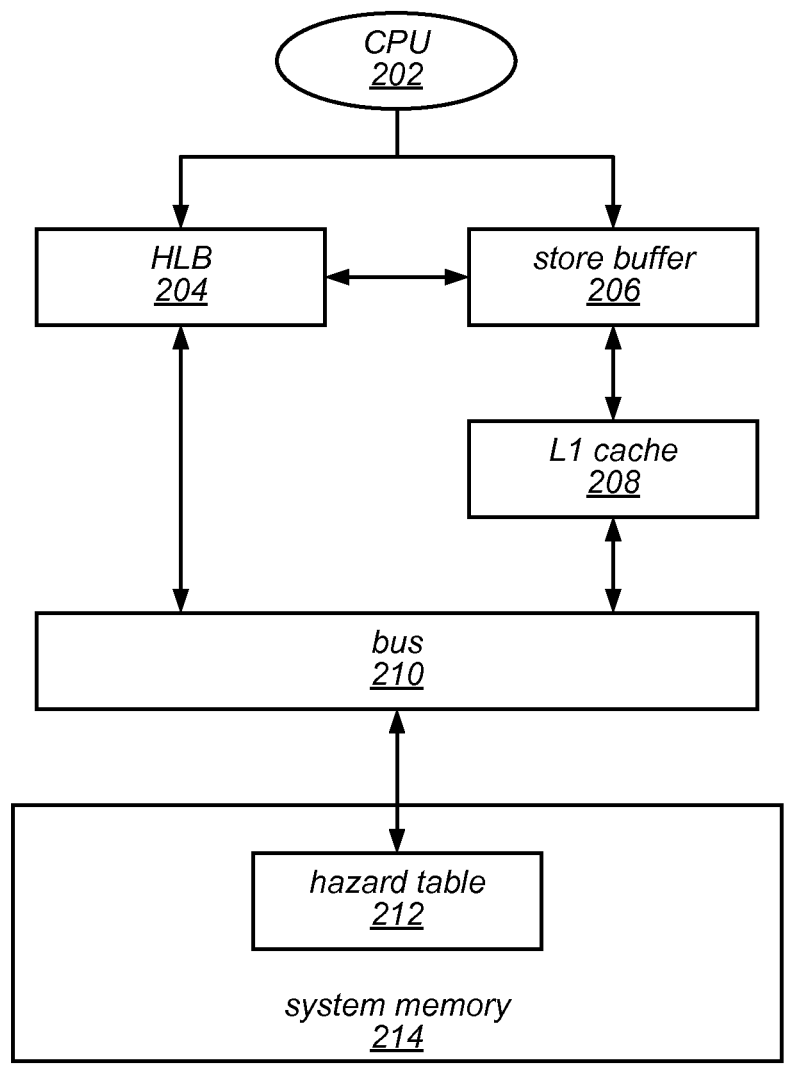
FIG. 2 is a block diagram illustrating a portion of a system that includes hazard lookaside buffers (HLBs), according to one embodiment.

For ease of exposition, it may be assumed that the techniques described herein are applied in a conventional bus-based architecture consisting of multiple CPUs, each with a store buffer and an L1 cache that are located between the CPU and the main bus, where the caches run a MESI cache coherence protocol over a shared bus. A portion of one such architecture is illustrated in FIG. 2 and described below. It may also be assumed that all addresses on the bus are cache-aligned (e.g., that they are multiples of the cache line size). In the descriptions that follow, if a is an address, "line (a)" may be used to denote the address of the first word in a cache line that contains a. In such systems, when the CPU issues a store instruction, the write targets the store buffer, and the contents of this buffer are not yet visible to other CPUs. Instead, the data that was written becomes visible to other CPUs only after the stores are written into the L1 cache. In such systems, once a thread arrives at a hazard pointer, it cannot be sure that other threads, running on other cores, actually see this value being written to the hazard pointer. Conventional hazard pointer algorithms address this issue by including memory barriers, which may ensure that for every load that is made after such a store, a sequential order is guaranteed.

In some embodiments of the systems described herein, as with a conventional hazard pointers approach, it may be assumed that the threads share a hazard table (or a similar data structure that contains all potentially hazardous pointers). In this type of architecture, which is common in commercial processors, an additional mechanism may be introduced to ensure that another thread that tries to reclaim memory can see such stores without having to resort to the use of expensive memory barriers. As described in more detail herein, in some embodiments, the systems described herein may include a hardware extension that aims to reduce the use of expensive memory barriers in a highly robust memory reclamation technique for concurrent data structures. In some embodiments of these systems, it may be possible to reduce (or eliminate altogether) the use of memory barriers in a memory reclamation mechanism. Based on the evaluation described herein, it appears that this technique may lead to very substantial performance improvements for concurrent data structures, in at least some embodiments The hardware-assisted mechanism described herein may, in at least some embodiments, combine the robustness of hazard pointers with the performance of epoch-based reclamation. Introducing this mechanism into a system may involve the following architectural changes:

Support for two new instruction codes (a special test operation, and a special store operation) may be added to the CPUs.

A new hardware unit, the hazard lookaside buffer (HLB), may be added in parallel with the store buffer. This mechanism may snoop on the cache coherence protocol and interact with the store buffer.

Supporting the hardware-assisted mechanism described herein may involve only minimal changes to the memory hierarchy. Note, for example, that there may be no changes made to the native cache coherence protocol to support this mechanism. Using this approach, the frequent memory barriers normally required by hazard pointer reclamation may be replaced with an infrequent additional cache-coherence transaction, while providing the same level of robustness as the hazard pointer scheme.

In some embodiments, each processor core may have (or be associated with) a hazard lookaside buffer (HLB) that is implemented in hardware. This device, which in some ways may be similar to a store buffer, may be configured to snoop on coherence traffic, and to keep track of hazardous pointers that may be in the store buffer. In some embodiments, the HLB may store a collection of entries, where each entry is a pair consisting of a hazard pointer and a table address. More specifically, each HLB entry may keep track of a hazard pointer that has not yet been written to memory and the address to which it will be written (e.g., the address of an entry in a hazard table). The HLB may be smaller than the store buffer or may be the same size as the store buffer, in different embodiments. The HLB may be searchable by both pointer and table fields.

In some embodiments, before a thread recycles a potentially hazardous memory block, it may issue a cache-coherence transaction for that pointer (e.g., one that queries the HLBs of all of the processor cores). The HLBs may respond if that pointer is being written to memory (e.g., if that pointer is resident in the HLB). If no HLB responds, then (as in the standard hazard pointer algorithm), the querying thread may check another buffer (e.g., a hazard table) that resides in memory to see if it contains the pointer. However, since memory reclamation is performed relatively infrequently, this operation may be out of the critical path of an executing application.

FIG. 2 is a block diagram illustrating a portion of a system architecture that includes hazard lookaside buffers (HLBs), according to one embodiment. In this example, the illustrated portion of the system includes a CPU 202, which may include multiple processor cores, each of which may be single-threaded or multi-threaded. In this example, CPU 202 includes, or is associated with an HLB 204, a store buffer 206, and an L1 cache 208. As illustrated in FIG. 2, the CPU may write entries into store buffer 206 (which may later be written into L1 cache 208) and/or into HLB 204. In this example, store buffer entries (which may include hazard pointer information) may be flushed from L1 cache 208 to system (main) memory 214 over bus 210, under certain conditions. More specifically, store buffer entries that include hazard pointer information may be flushed to hazard table 212 within system memory 214. Note that shared hazard table 212 may also be accessed by multiple cores/threads and/or by cores/threads of other CPUs (not shown), each of which includes, or is associated with, a corresponding HLB, store buffer, and L1 cache.

As described in more detail herein, HLB 204 may snoop on coherence traffic, and may keep track of hazardous pointers that may be in the store buffer 206. In some embodiments, HLB 204 may snoop bus 210, and may detect the broadcast of a query for a particular hazard pointer. As described in more detail herein, in a system that includes hazard lookaside buffers (HLBs), as in FIG. 2, there may be fewer times that CPU 202 needs to read from hazard table 212 than in a system that implements a conventional hazard pointer approach. In addition, in a system that includes hazard lookaside buffers (HLBs), as in FIG. 2, there may be fewer times that CPU 202 needs to issue memory barriers (e.g., to flush the store buffers) than in a system that implements a conventional hazard pointer approach.

Figure 3:
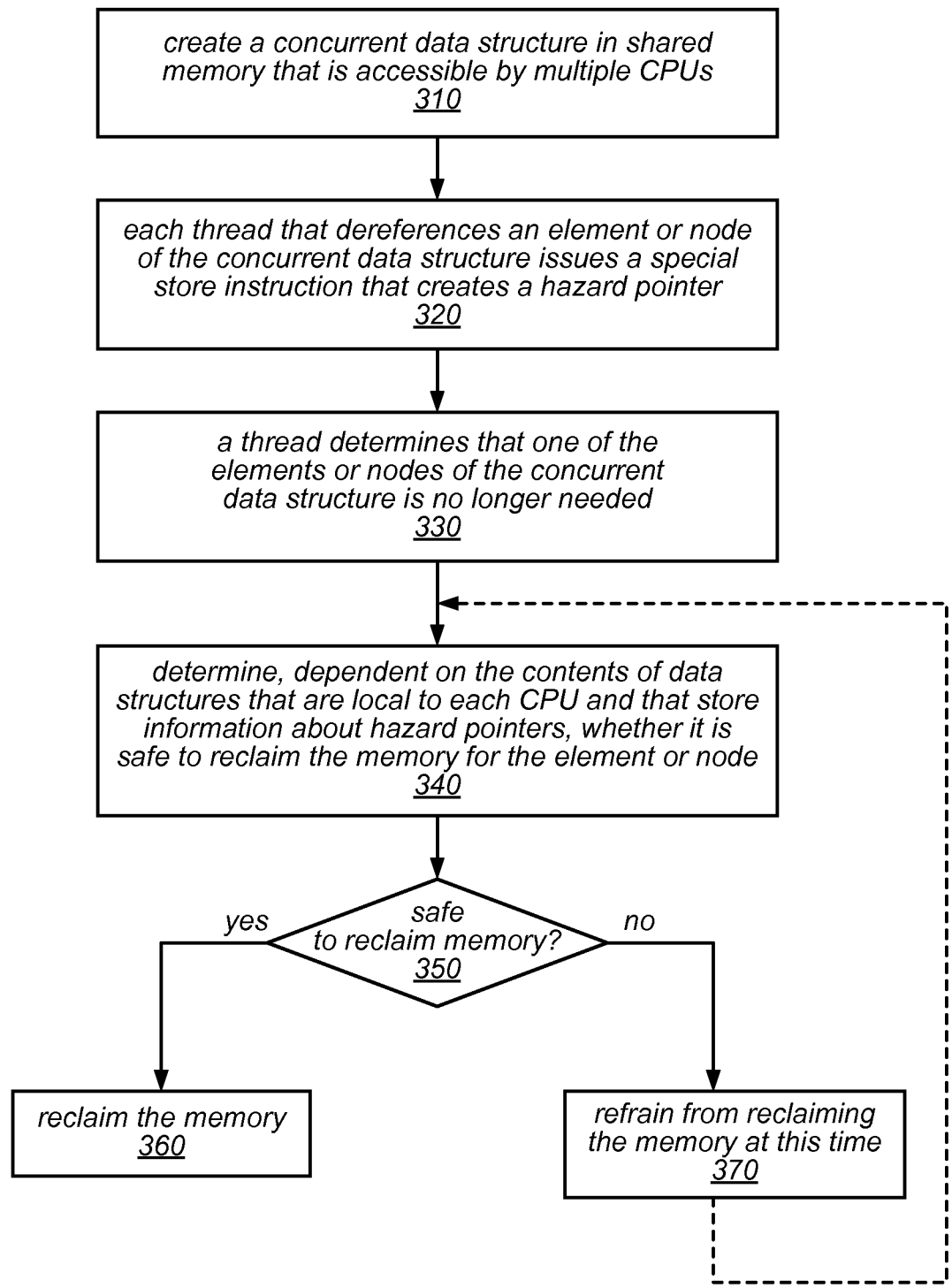
FIG. 3 is a flow diagram illustrating one embodiment of a method for utilizing hazard lookaside buffers when performing memory reclamation.
Figure 4:
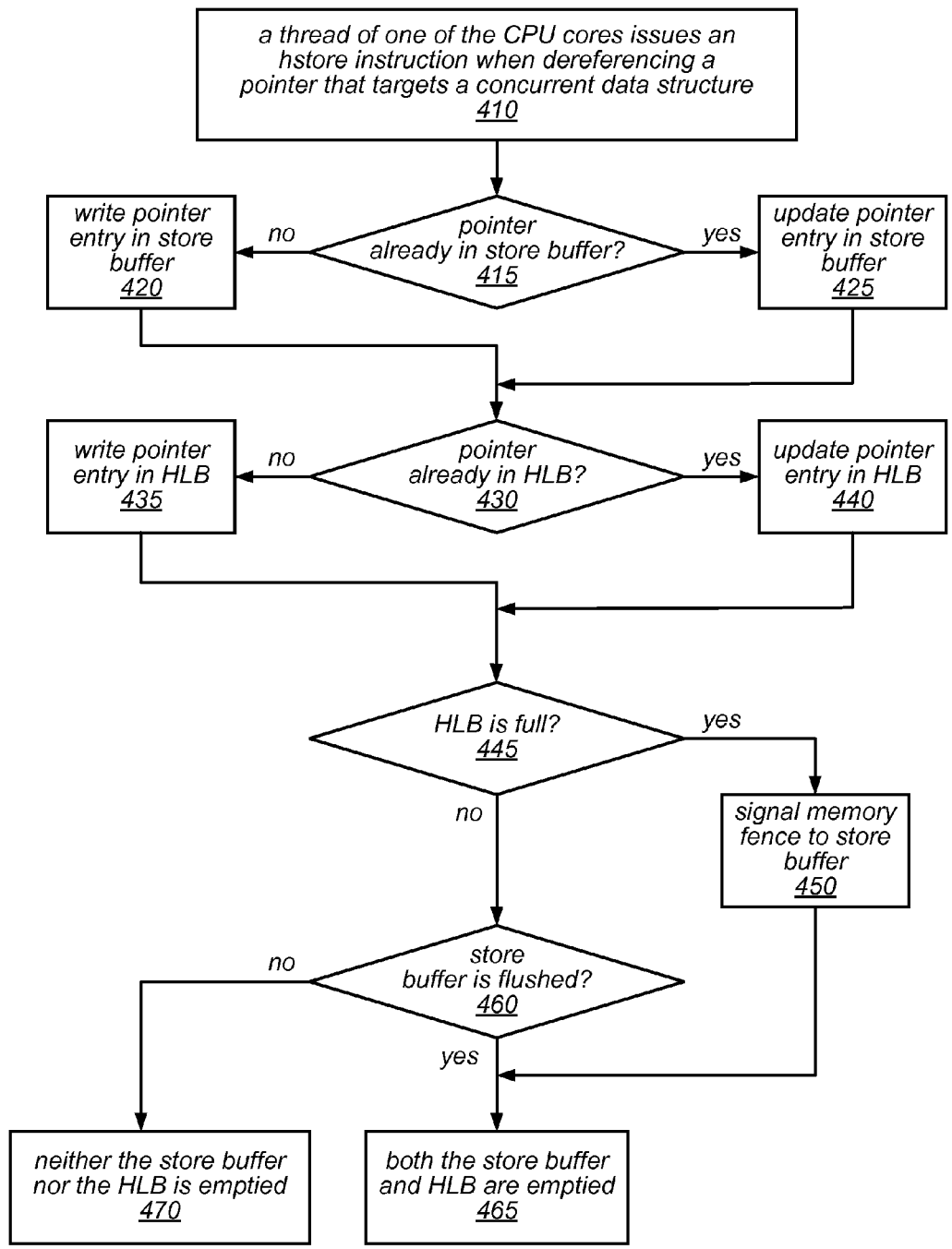
FIG. 4 is a flow diagram illustrating one embodiment of a method for utilizing an hstore instruction to create a hazard pointer.

One embodiment of a method for utilizing hazard lookaside buffers when performing memory reclamation is illustrated by the flow diagram in FIG. 3. As illustrated at 310, in this example, the method may include creating a concurrent data structure in a shared memory that is accessible by multiple CPUs (e.g., multiple processor cores and/or threads). The method may include each thread that dereferences an element or node of the concurrent data structure issuing a special store instruction that creates a hazard pointer, as in 320. One embodiment of method for utilizing such an instruction is illustrated in FIG. 4 and described in more detail below.

As illustrated in FIG. 3, the method may include one of the threads determining that one of the elements or nodes of the concurrent data structure is no longer needed (as in 330). For example, the thread may determine that the element or node can and should be retired or otherwise removed from the concurrent data structure. In response, the method may include the thread determining, dependent (at least in part) on the contents of data structures that are local to each CPU and that store information about hazard pointers, whether it is safe to reclaim the memory for the element or node (as in 340). As described in more detail below, in some embodiments, the thread may issue a special instruction to query hazard lookaside buffers for all of the CPUs that share a hazard table in system memory and/or that have access to the concurrent data structure in system memory, and those hazard lookaside buffers may store information about hazard pointers.

If the thread determines that it is safe to reclaim the memory for the concurrent data structure element or node (shown as the positive exit from 350), the method may include reclaiming the memory for the element or node that is no longer needed (as in 360). For example, the thread may invoke an operation to return the memory to a pool of available memory, in some embodiments. However, if the thread determines that it is not safe to reclaim the memory for the concurrent data structure element or node (shown as the negative exit from 350), the method may include refraining from reclaiming the memory for the concurrent data structure element or node at this time (as in 370).

As illustrated by the dashed line from 370 to 340 in FIG. 3, in some embodiments, the method may include repeating the operation shown at 340 one or more additional times (e.g., during the same memory reclamation operation or during subsequent memory reclamation operations) until it is safe to reclaim the memory for the concurrent data structure element or node.

As noted above, in some embodiments, all of the threads (on all of the processor cores) may share a hazard table that resides in main memory. This hazard table may serve as an overflow for the HLBs. In some embodiments, and under normal operation, a thread may not have to visit the hazard table, because the thread may fill up its HLB and then overwrite the entries of the HLB. However, in order to deal with the fact that there are only finite hardware resources and the potential for a developer to write a program that fills up the HLB, the hazard table may provide a place in the main memory for the overflow to go. In some embodiments, if a thread gets swapped out, it may dump its HLB into the main memory (e.g., into the hazard table) so that, while it is not running, another thread can find information about the hazard pointers it has created.

In some embodiments, each CPU may have (or be associated with) an HLB that is shared between its processor cores and threads (e.g., if it is a CPU that includes multiple processor cores and/or supports multithreading). However, in other embodiments, there may be one HLB per processor core. In general, the techniques described herein may be applied in systems that include one HLB per processor core, one HLB per socket (e.g., with one HLB shared between multiple processor cores on the same integrated circuit device or in the same multi-chip package), or using other mappings between HLBs and processing resources, some of which may require a developer to pay more attention to synchronization than others. In some embodiments, these systems may include an HLB in parallel with (and having the same granularity as) the L1 caches and/or store buffers in the system. However, in some embodiments, the store buffers may be finer grained than the L1 caches and HLBs (e.g., there may be one store buffer per logical CPU, in some architectures, even if multiple logical CPUs share an L1 cache). In general, the entries in the store buffer are for stores that have not made it out into the coherent world where other CPUs (or processor cores/thread thereof) can see the results of those operations, whereas the entries in the L1 caches are coherent.

In at least some embodiments, each thread may have a fixed maximum number of hazard pointers. In such embodiments, the hazard table may be an array in which each thread cycles through a pre-allocated range of slots. In systems that employ a conventional hazard pointer algorithm, threads would write hazard pointers out to this hazard table in memory, and other threads would have to check the hazard table to determine whether or not a particular pointer is hazardous. However, due to the introduction of HLBs in the systems described herein, threads may not always have to write out to (and subsequently check) the hazard table in main memory. Instead, for example, they may check the HLBs for a potentially hazardous pointer and may only have to check the hazard table in main memory if there is an overflow. In addition, rather than always having to force the stores of hazardous pointers out to the hazard table, this may happen much more rarely, if at all. In the case that an HLB overflows, an expensive memory barrier may be required. However, this may happen very infrequently, especially when compared with a conventional hazard pointer approach.

As previously noted, in order to take advantage of the HLB hardware and to keep track of stores of hazard pointers, the processors in the systems described herein may support two new instructions. In some embodiments, these new instructions may be implemented in the processor hardware and may be native instructions of its instruction set architecture (ISA). The first new instruction is a special hstore instruction, which operates as a store, but it gives a hint to the HLB that it needs to pay attention to (and to save in the HLB) information about an address and a value that are being stored to the store buffer. In some embodiments, the systems that include HLBs and that support such an instruction to use the HLBs in this way may support another special instruction that tests for whether a pointer is hazardous or not by querying the HLBs. As described in more detail herein, if a pointer is found in one of the HLBs, this may indicate that the pointer is (at least potentially) hazardous and there may be no need to access the hazard pointer in memory.

Normally, when the CPU stores value v at an address a, it creates an entry containing the pair (v, a) in the store buffer, and the L1 issues a read-to-own bus transaction for address line (a). Note that if the store buffer is fill, the store may stall while the contents of the store buffer are moved to the L1 cache. If the CPU issues two stores to address a, and the second store takes place while the first is still in the store buffer, the second store's entry may overwrite the first store's entry in the store buffer, a process called write absorption. A CPU can issue a memory fence that forces all entries in the store buffer into the L1 cache.

The hstore instruction takes the form hstore (ptr, tab), where the ptr operand represents a hazard pointer (a pointer to a dereferenced address that has not yet been written to memory), and the tab operand represents the address to which the hazard pointer will be written (e.g., the address of a shared hazard table in memory, or of an entry thereof). In at least some embodiments of the systems described herein, when the CPU issues an hstore (ptr, tab) call, it may be configured to add a (ptr, tab) entry to the store buffer, and to add a (ptr, tab) entry to the HLB, as well. In some embodiment, the HLB, like the store buffer, may perform write absorption. In such embodiments, if there is a second write/store to a hazard pointer that is stored in the HLB (e.g., with a new value for the pointer), the second write/store may replace that entry in the HLB. In some embodiments, if the HLB is full, it may signal a memory fence to the store buffer, which may result in emptying both buffers. Conversely, if the store buffer is flushed by a fence, the HLB may also be emptied. In some embodiments, if a thread is swapped out, a memory fence may force stores in the store buffer to be written to the L1, and dirty cache lines may be written back to memory, causing the HLB to be emptied as well.

In some embodiments, the store and memory barrier calls used in conventional systems to create a hazard pointer may be replaced by a call to the hstore instruction. For example, an hstore instruction may replace the store and memory barrier calls at Lines 4-5 in the pseudo-code for the hazardRead function illustrated earlier. This change is shown in the example pseudo-code below.

```
1  Node* hazardRead2(Node** object, Node* table) {
2      while (true) {
3          Node* read = *object;
4          hstore (read, table);
5          Node* reread = *object;
6          if (read == reread) {
7              return read;
8          }
9      }
10 }
```

One embodiment of a method for utilizing an hstore instruction to create a hazard pointer is illustrated by the flow diagram in FIG. 4. As illustrated at 410, in this example, the method may include a thread of one of multiple CPU cores that have access to a concurrent data structure issuing an hstore instruction when dereferencing a pointer that targets the concurrent data structure. For example, the thread may issue an hstore instruction that (ostensibly) writes a hazard pointer to a shared hazard table in system memory. If an entry for this pointer already resides in the store buffer (shown as the positive exit from 415), the method may include updating that pointer entry in the store buffer (as in 425). However, if there is not an entry for this pointer in the store buffer (shown as the negative exit from 415), the method may include writing a pointer entry in the store buffer (as in 420).

As illustrated in this example, if an entry for this pointer already resides in the HLB (shown as the positive exit form 430), the method may include updating that pointer entry in the HLB (as in 440). However, if there is not an entry for this pointer in the HLB (shown as the negative exit from 430), the method may include writing a pointer entry in HLB (as in 435).

As illustrated in this example, if the HLB is full (shown as the positive exit from 445), the method may include the HLB signaling a memory fence to the store buffer (as in 450). In addition, if the store buffer is flushed (e.g., by a memory fence signaled by the HLB or by another memory fence, as in 460), the method may include emptying both the store buffer and the HLB (as in 465). For example, in some embodiments, a memory fence may force stores in the store buffer to be written to the L1 cache. In this case, the HLB may be emptied as well. However, if neither of these conditions is true, the method may not include emptying the store buffer or the HLB as a result of the issuing of the hstore instruction. This is illustrated in FIG. 4 by the negative exit from 460 and element 470.

In some embodiments, if, at any point subsequent to the execution of the hstore instruction, the HLB containing the hazard pointer created by that instruction is full or the store buffer containing the hazard pointer created by that instruction is flushed, both the store buffer and the HLB may be emptied.

In the example pseudo-code for the hazardRead2 function shown above, the while loop in Lines 2-9 is needed because reading a value from a location that is pointed to and writing the pointer itself to a different location in memory is non-atomic (e.g., the value in the location pointed to could change in between these operations). In an alternate embodiment, the systems described herein may support a variation of the hstore instruction that can do both things atomically (e.g., read a value identified by the pointer and write that value into the HLB). Such an instruction may take the form hload (ptrLoc, tab), where the ptrLoc operand represents the location of a hazard pointer (a pointer to a dereferenced address that has not yet been written to memory), and the tab operand represents the address to which the hazard pointer will be written (e.g., the address of a shared hazard table in memory, or of an entry thereof). In such an embodiment, this alternate hload instruction may replace the entire while loop in Lines 2-9 in the example pseudo-code for the hazardRead2 function shown above.

As previously noted, the systems described herein may support a second instruction that can be used to query the HLB for a given hazard pointer. For example, an htest instruction may take the form htest (ptr), where the ptr operand represents a potentially hazardous pointer. In some embodiments, the htest (ptr) instruction may return a Boolean (or set a flag) to indicate that the pointer identified by its operand was found in one of the HLBs (and, thus, that it may be hazardous and the corresponding memory location should not be reclaimed). For example, if the htest (ptr) returns "true", then the pointer identified by its ptr operand is hazardous. Otherwise, the caller must check the hazard table to determine whether that pointer is hazardous.

In some embodiments, when a CPU issues an htest (ptr) call, it broadcasts a bus transaction. All of the HLBs snoop the bus, and if any of them contains an entry for the pointer, e.g., an entry (ptr, *), it may reply to the bus transaction that was broadcast. In other words, if, as part of a memory recycling/reclamation operation, a CPU issues an htest instruction, it broadcasts a message indicating that each HLB component should check its buffer to see if the specified pointer resides in the buffer. If so, that HLB component may send back a response (e.g., it may return a Boolean value or set a flag, in different embodiments). In some embodiments, if an HLB does not contain an entry for the specified pointer, it may not need to respond to the bus transaction that was broadcast at all. In some embodiments, it may be possible for multiple HLBs to respond to the broadcast bus transaction, but the caller may ignore any additional responses once a single response has been received from any of the HLBs.

Note that, in some embodiments, the htest instruction may not actually broadcast the bus transaction described above, but may use a different type of coherence protocol to indicate that all of the HLBs should query their buffers. For example, there are multiple types of commonly used coherence protocols in the types of systems described herein. One protocol may support broadcasting. However, these systems may support other mechanisms for the HLB called directory caches (or hybrids of the two). For example, a directory cache knows specifically which other caches might contain a particular cache line. In some embodiments that implement a directory cache mechanism for the HLBs, the coherent probes may only be sent to specific HLBs, which may reduce traffic on the interconnect.

Figure 5:
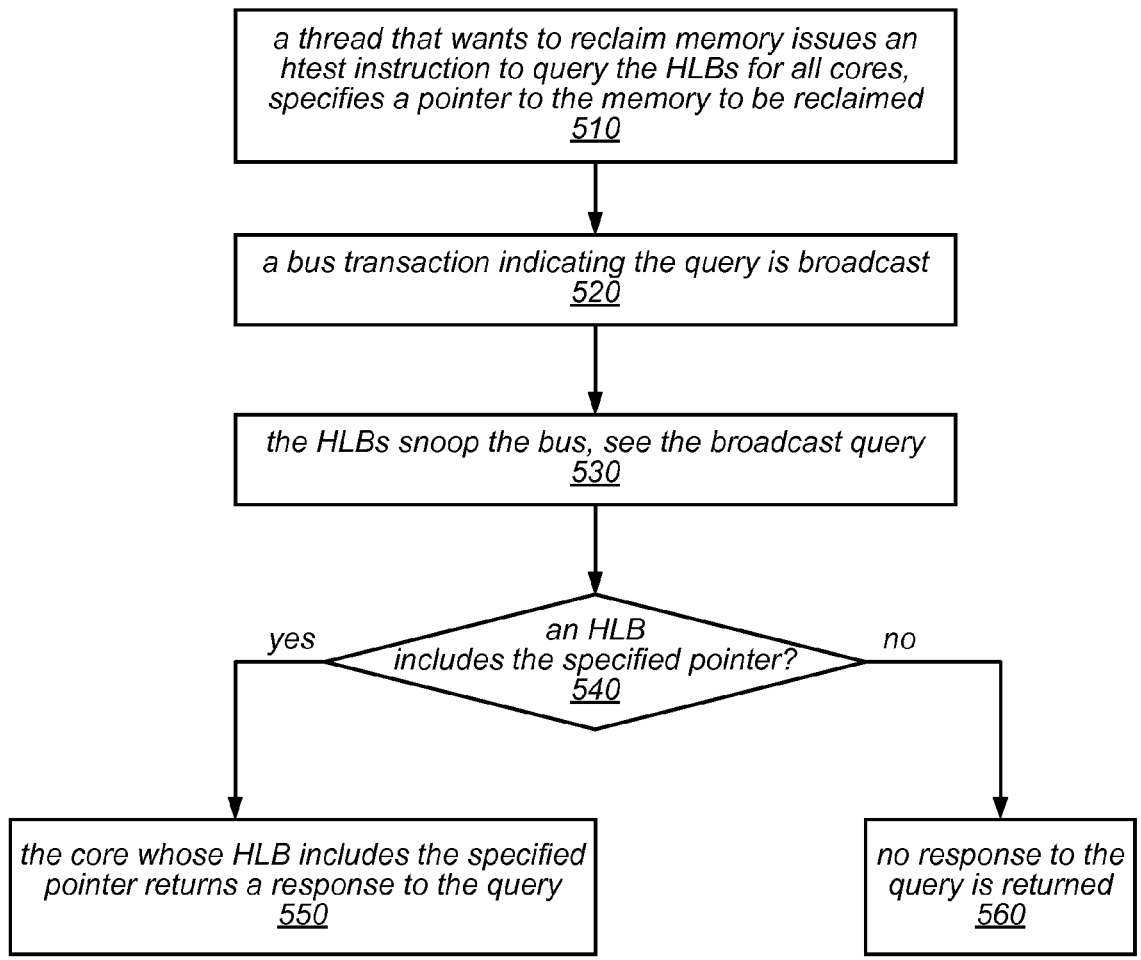
FIG. 5 is a flow diagram illustrating one embodiment of a method for utilizing an htest instruction to query multiple hazard lookaside buffers.

One embodiment of a method for utilizing an htest instruction to query multiple hazard lookaside buffers is illustrated by the flow diagram in FIG. 5. As illustrated at 510, in this example, the method may include a thread that wants to reclaim memory issuing an htest instruction to query the HLBs for all cores (e.g., for all cores that share a hazard table in system memory and/or that have access to a particular concurrent data structure in system memory). This instruction may specify a pointer to the memory to be reclaimed (e.g., a pointer to an element or node of a concurrent data structure that is no longer needed). In response to the issuing of the htest instruction, the method may include broadcasting a bus transaction indicating the query on the bus (as in 520). The method may include the HLBs for all of the cores snooping the bus, and seeing the broadcast query (as in 530).

If one of the HLBs includes the specified pointer (shown as the positive exit from 540), the method may include the core whose HLB includes the specified pointer returning a response to the query (as in 550). For example, the core may return "true" in response to the query, in some embodiments. However, if none of the HLBs includes the specified pointer (shown as the negative exit from 540), there may be no response returned for this query (as shown in 560).

As previously noted, if a particular pointer is not found in any of the HLBs, the thread performing a memory recycling/reclamation operation may need to check the shared hazard table in memory to determine whether or not the pointer is hazardous. In other words, in some embodiments, there may be up to two steps performed to determine whether it is safe to reclaim a node. First, if htest (ptr) returns "true", then the pointer is a potential hazard. Otherwise, if that pointer is present in the hazard table, then it is a potential hazard. In some embodiments, the mechanisms described herein may ensure that every hazardous pointer will fail at least one of these two tests, while normally not requiring a memory barrier after every store to a hazard pointer. Note, however, that if the htest instruction returns true for a particular pointer, the memory recycling/reclamation operation may skip the more expensive check of the shared hazard table for that pointer. Note that when both tests are performed, this may be more expensive than the test done in the original recycle function shown above. However, the use of the HLBs may make this more expensive operation very rare. In the much more common case (e.g., the case in which a hazardous pointer is found in one of the HLBs), the test itself may be much less expensive to perform and no expensive memory barriers are required.

In one example, an additional nested if statement that issues an htest instruction may be inserted into the example pseudo-code for the recycle function shown above. This change is shown in the example pseudo-code below.

```
1  void recycle2 ( ) {
2      Node* prev = retired ;
3      Node* curr = retired ->next;
4      while (curr != NULL) {
5        if htest(curr) {
6          curr = curr->next; // hazardous, skip
7        } else if (hazardTable->contains(curr)) {
8            curr = curr->next;   // hazardous, skip
9        } else {
10           prev->next = curr->next;   // not hazardous, recycle
11           free (curr);
12           curr = prev->next;
13       }
14    }
15 }
```

Figure 6:
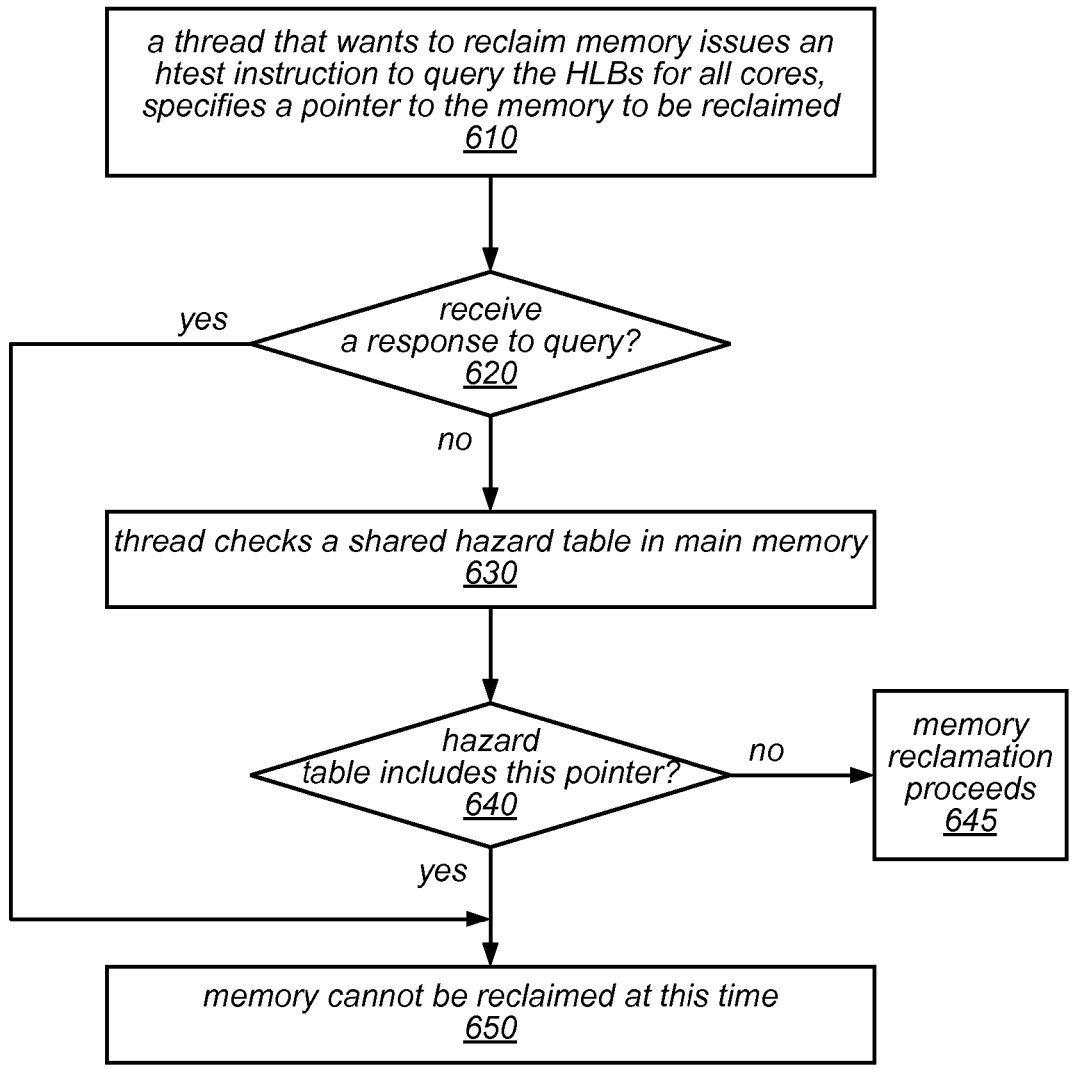
FIG. 6 is a flow diagram illustrating one embodiment of a method for performing a memory reclamation operation.

One embodiment of a method for performing a memory reclamation operation is illustrated by the flow diagram in FIG. 6. As illustrated at 610, in this example, the method may include a thread that wants to reclaim memory issuing an htest instruction to query the HLBs for all cores (e.g., for all cores that share a hazard table in system memory and/or that have access to a particular concurrent data structure in system memory). This instruction may specify a pointer to the memory to be reclaimed (e.g., a pointer to an element or node of a concurrent data structure that is no longer needed).

If a response to the query is received (indicating that the pointer resides in at least one of the HLBs, shown as the positive exit from 620), the pointer is potentially hazardous, and the memory cannot be reclaimed at this time (as shown at 650). In this case, since it has already been determined that the pointer is potentially hazardous, the operations illustrated at 630-645 may be elided.

As illustrated in FIG. 6, if no response to the query is received (indicating that the pointer does not currently reside in any of the HLBs, shown as the negative exit from 620), the method may include the thread checking a shared hazard table in main memory to determine whether or not the pointer is potentially hazardous (as in 630). If the hazard table includes this pointer (shown as the positive exit from 640), the pointer is potentially hazardous, and the memory cannot be reclaimed at this time (as shown at 650). However, if the hazard table does not include this pointer (shown as the negative exit from 640), the method may include proceeding with an operation to reclaim the memory (as in 645).

Note that, in some embodiments, the method may include repeating some or all of the operations illustrated in 610 one or more additional times (e.g., during the same memory reclamation operation or during one or more subsequent memory reclamation operations) until it is safe to reclaim the memory for the concurrent data structure element or node.

Many (if not most) data structures that use hazard pointers store them in a circular buffer, overwriting older pointers with new ones. For instance, a linked list implementation may require just two hazard pointers per thread, regardless of the size of the list. In some embodiment, if the HLB is at least as large as the circular buffer, then a thread may be able to traverse a data structure without a single hazard-induced memory barrier. Otherwise, if the HLB is smaller and has a size of k entries, then the number of memory barriers may be reduced by a factor of k. For other types of data structures, the number of hazard pointers may not be constant (nor relatively small, as with a linked list). For example, for skip-lists and/or binary trees, the system may need to support a variable number of hazard pointers. In embodiments that support these types of data structures, having an HLB that is smaller than the corresponding store buffer may mean that there are more scenarios under which the HLB fills up and is flushed to the hazard table (causing the store buffer to be flushed, as well). In other embodiments (under similar scenarios), it may not be necessary to perform a memory fence to force a flush of the store buffer, but a local penalty may be induced nonetheless. In general, there may be little or no benefit to having an HLB that is larger than the corresponding store buffer. Therefore, in at least some embodiments, the HLB may be the same size as the store buffer.

In some embodiments, if the HLB and the store buffer are the same size, they may be merged into a single unit, combining the functionality of both. This architecture may eliminate the need for the specialized hstore instruction, which may be replaced with a regular store instruction in the harzardRead2 code shown above. However, in such embodiments, the htest instruction (or a variation thereof) may still be used to check this combined hardware buffer for a particular pointer, as described above, and may allow a memory recycling/reclamation operation to skip checking a shared hazard table in memory, in many cases.

In some embodiments, the HLB may be designed to snoop on traffic from the store buffer to the L1 cache, and may discard entry whose address is observed to be removed from the store buffer. This design may reduce the likelihood of HLB overflow, in some embodiments.

Figure 7:
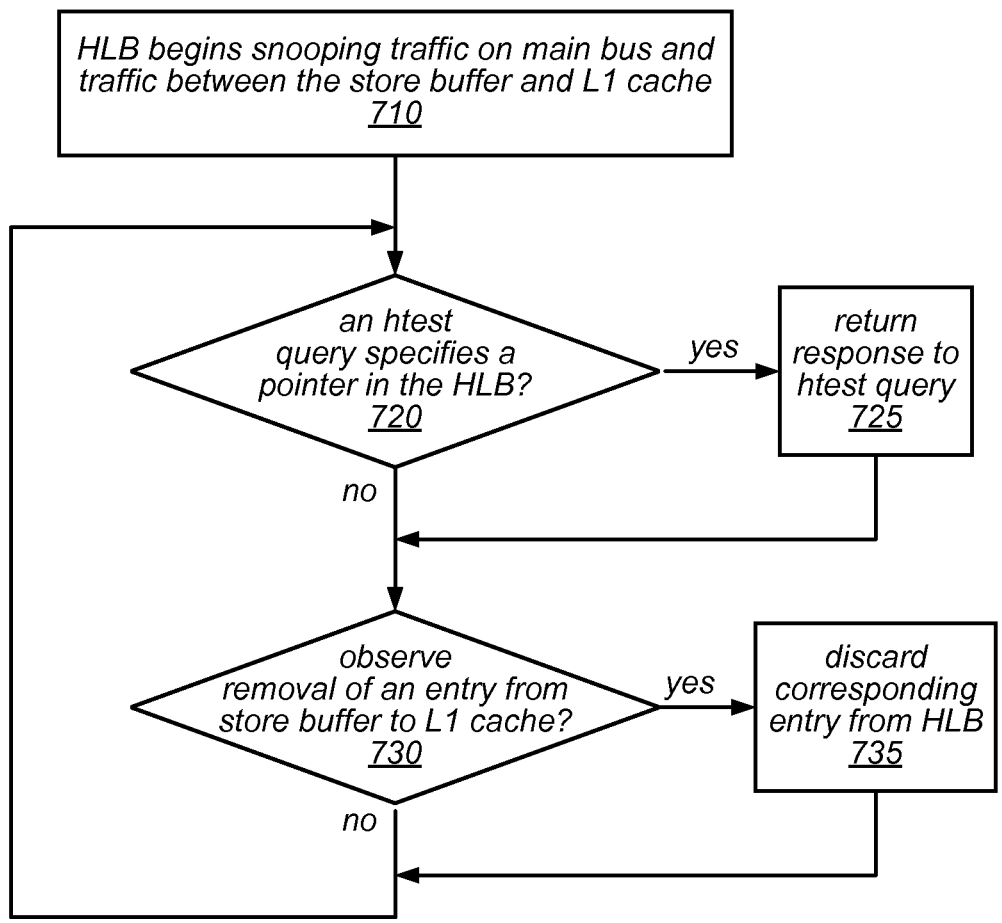
FIG. 7 is a flow diagram illustrating one embodiment of a method for utilizing hazard lookaside buffer hardware to snoop traffic.

One embodiment of a method for utilizing hazard lookaside buffer hardware to snoop traffic is illustrated by the flow diagram in FIG. 7. As illustrated at 710, in this example, the method may include the hardware within an HLB beginning to snoop traffic on the main (system) bus and to snoop traffic between the store buffer and L1 cache that are associated with the HLB (and/or a corresponding CPU, core, or thread). If the HLB observes an htest query on the main bus that specifies a pointer that is resident in the HLB (shown as the positive exit from 720), the method may include returning a response to the htest query (as in 725). Otherwise, as previously noted, there may be no need to return a response to the htest query.

As illustrated in this example, if the HLB observes the removal of an entry from the store buffer to the L1 cache (shown as the positive exit from 730), the method may include discarding the corresponding entry from the HLB (as in 735). Note that, as illustrated by the feedback from 730 to 720, in some embodiments, the HLB may continue to snoop traffic on main bus and traffic between the store buffer and L1 cache (as in 710), and if (at any time) either of the two conditions shown in 720 and 730 is met, may perform the corresponding action (as shown in 725 and 735, respectively). Note also that, while the operations shown as 720 and 730 are illustrated in FIG. 7 as if they were performed serially and in a particular order, in other embodiments these operations may be performed in another order, or both operation may be performed continuously and, essentially in parallel. For example, in some embodiments, hardware within the HLB may be configured to test for both conditions in parallel and to take appropriate action if and when either of these conditions is met.

As described herein, in various embodiments, the techniques described herein for utilizing hardware extensions for memory reclamation (e.g., HLBs and a new htest instruction that takes advantage of them) may improve the performance of memory recycling/reclamation operations over those of conventional systems that employ hazard pointers. However, in some embodiments, an even larger advantage of these systems over conventional ones may be realized when referencing an object (e.g., element of a concurrent data structure) in systems that employ hazard pointers, since the use of the hstore instruction may reduce or eliminate the need for expensive memory pointers in this case. This is because, in the vast majority of applications, the number of times that an object is referenced (and a corresponding pointer is dereferenced) may be many orders of magnitude higher than the number of times that the object is deleted and its memory is reclaimed.

The techniques described herein for utilizing hardware extensions for memory reclamation may be directly applicable to any software application that uses concurrent data structures in an unmanaged runtime environment. For example, it may be directly applied to software written in C and/or C++ programming languages.

Example Computer System

Figure 8:
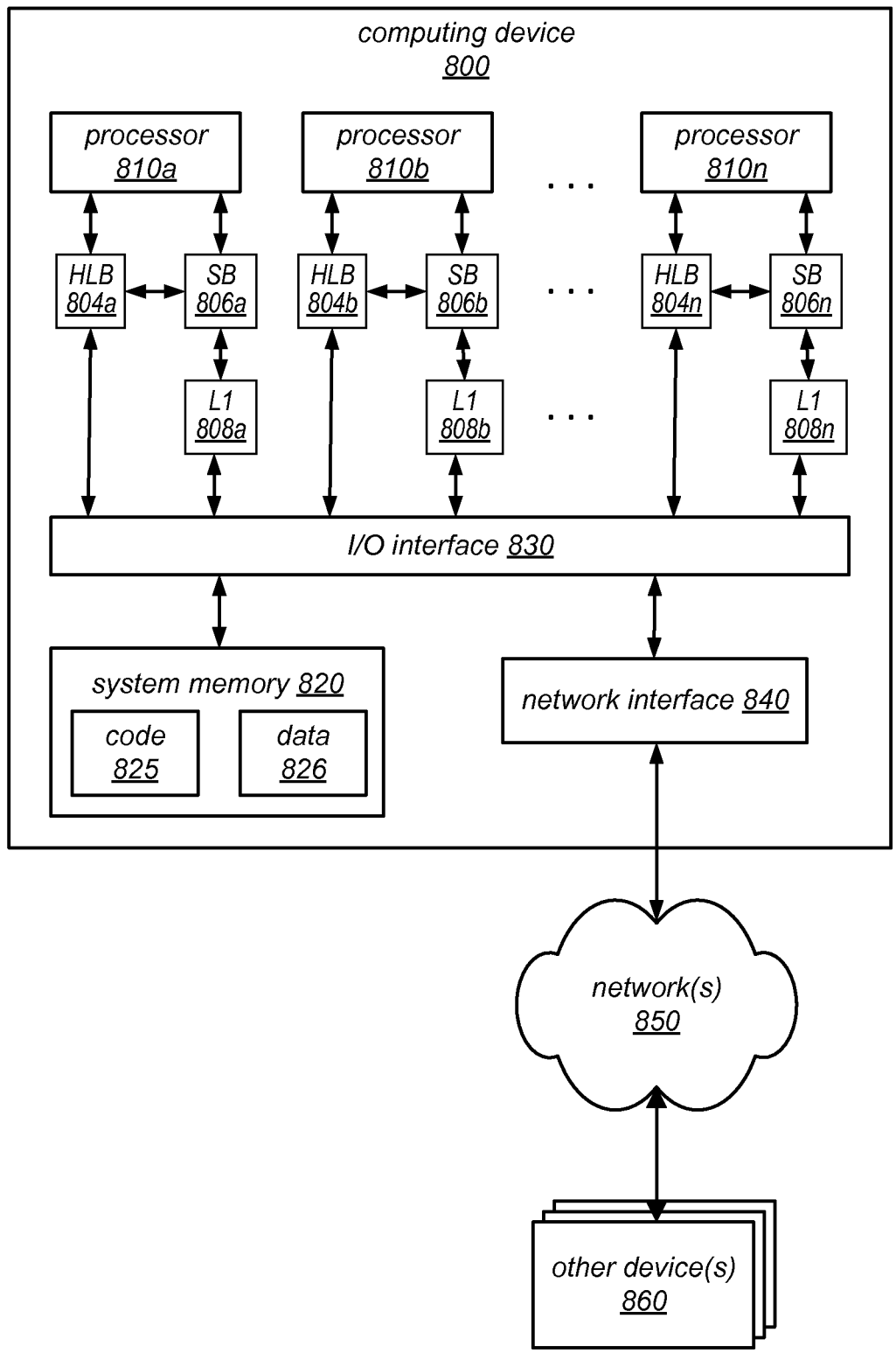
FIG. 8 is a block diagram illustrating a computing system configured to utilize hazard lookaside buffers when performing memory reclamation, according to various embodiments.

FIG. 8 illustrates a computing system configured to implement some or all of the hardware mechanisms and methods described herein, according to various embodiments. The computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In at least some embodiments, computer system 800 may include or be configured to access one or more computer-readable media, which may store program instructions suitable for implementing some of the methods, features and/or enhancements described herein. For example, computing device 800 may be configured to host one or more portions of a multithreaded, distributed, or concurrent application, threads of which may access various elements or nodes of a concurrent data structure. In the illustrated embodiment, computing device 800 includes one or more processors 810 (shown as 810a-810n) that are coupled to a system memory 820 via an input/output (I/O) interface 830. More specifically, computing device 800 may include respective store buffers 806, L1 caches 808, and/or HLBs 804 (such as those illustrated in FIG. 2 and described herein) between each of the processors 810 and input/output (I/O) interface 830. Note that, in some embodiments, computing device 800 may implement a cache hierarchy that includes other caches at different levels (e.g., L2 caches, L3 caches, etc.), which are not shown in FIG. 8. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may include any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions and data accessible by processor(s) 810. In some embodiments, some portions of system memory 820 may be local memory to a particular processor 810, while other portions of system memory 820 may be shared between (and accessible by) all of the processors 810 and/or with other computing devices 860. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code (i.e., program instructions) 825 and data 826. For example, memory 820 as well as code 825 and data 826 may store, in one embodiment, program instructions and data for implementing a compiler (e.g., one that is configured to support the hstore, hload, and/or htest instructions described herein), a multithreaded, distributed, or concurrent application that calls the hstore, hload, and/or htest instructions described herein to take advantage of the hardware extensions provided by the hazard lookaside buffers, a process for reclaiming memory that has been determined to be safe to reclaim, and/or various libraries (one of which may include operations for creating concurrent data structures, allocating memory for various elements or nodes of concurrent data structures, and/or returning memory that is no longer needed to a pool of memory). In some embodiments, data 826 may include a concurrent data structure and/or a shared hazard table, such as hazard table 212 illustrated in FIG. 2 and described herein.

In various embodiments, a compiler, a multithreaded, distributed or concurrent application, a process for reclaiming memory, and/or a library (and/or any individual sub-modules thereof) used in implementing the techniques described may each be implemented using any of various programming languages or methods. For example, in one embodiment, code for implementing a compiler, application, and/or library may be written in any of the C, C++, assembly, JAVA or other general-purpose programing languages, while in another embodiment, one or more of them may be written using a different, more specialized, programming language. Moreover, in some embodiments, a compiler, an application, and/or a library (and/or various sub-modules thereof) used in implementing the techniques described herein may each be implemented using a different programming language.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 830, such as an interface to system memory 820, may be incorporated directly into processor 810.

Network interface 840 may be configured to allow data to be exchanged between computing device 800 and other devices 860 attached to a network or networks 850, such as other computer systems or devices. In various embodiments, network interface 840 may support communication via any suitable wired or wireless general data networks, such as types of Ethernet network, for example. In some embodiments, network interface 840 may be a low-latency interface (e.g., an InfiniBand interconnect or another low-latency interface) over which multiple nodes of a distributed system (any or all of which may be implemented on a computing device similar to computing device 800) communicate with each other.

In some embodiments, system memory 820 may be one embodiment of a computer-readable (e.g., computer-accessible) medium configured to store program instructions and data, as described above, for implementing embodiments of the techniques described herein. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory.

Further, a computer-readable medium may include transmission media or signals such as electrical, electromagnetic, or digital signals, conveyed via a communication medium such as a network and/or a wireless link, such as may be implemented via network interface 840. Portions or all of multiple computing devices such as that illustrated in FIG. 8 may be used to implement the described functionality in various embodiments; for example, software components running on a variety of different devices and servers may collaborate to provide the described functionality. In some embodiments, portions of the described functionality may be implemented using storage devices, network devices, or special-purpose computer systems, in addition to or instead of being implemented using general-purpose computer systems. The term "computing device," as used herein, refers to at least all of these types of devices, and is not limited to these types of devices.

Various embodiments may further include receiving, sending, or storing instructions and/or data implemented in accordance with the foregoing description upon a computer-readable medium. Generally speaking, a computer-readable medium may include non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions), in some embodiments.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by a hazard lookaside buffer may, in some embodiments, be performed by another component (e.g., a specialized store buffer) and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. For example, while some of the example embodiments included herein were described in terms of a conventional bus-based architecture consisting of multiple CPUs, each with a store buffer and an L1 cache that are located between the CPU and the main bus, where the caches run a MESI cache coherence protocol over a shared bus, in other embodiments, these mechanisms and techniques described herein may be applied in systems that employ other architectures. It is intended that the following claims be interpreted to embrace all such variations and modifications.

What is claimed is:

1. A method, comprising:
performing, by a plurality of computing nodes:
beginning execution of a multithreaded application that comprises one or more accesses to a concurrent data structure that is accessible to multiple threads of the multithreaded application;
issuing, by a thread or process executing on a processor core of one of the plurality of computing nodes, an instruction to store a pointer to a location in a shared memory at which an element of the concurrent data structure resides to the hazard table; and
in response to said issuing:
storing an entry for the pointer to a hazard lookaside buffer component that is locally accessible to the processor core, wherein the hazard lookaside buffer component is configured to store information about pointers that have been or are going to be dereferenced by software executing on the processor core and about which information has not yet been written to the hazard table, and wherein said storing the pointer to the hazard lookaside buffer does not require the thread or process to issue a memory barrier instruction following the issuing of the instruction.

2. The method of claim 1, wherein said issuing is performed in response to the thread or process issuing an instruction that dereferences the pointer.

3. The method of claim 1, further comprising:
issuing, by the thread or process, another instruction that dereferences the pointer;
determining that an entry for the pointer is stored in the hazard lookaside buffer component that is locally accessible to the processor core; and
overwriting the entry for the pointer stored in the hazard lookaside buffer component that is locally accessible to the processor core.

4. The method of claim 1, further comprising:
determining that the hazard lookaside buffer component is full; and
in response to said determining, writing information about one or more pointers that have been dereferenced or are going to be dereferenced by software executing on the processor core to the hazard table.

5. The method of claim 1, further comprising:
performing, by the thread or process, a memory reclamation operation, wherein said performing comprises:
issuing an instruction for determining whether or not an entry for a given pointer resides in any one or more of a plurality of hazard lookaside buffer components, including the hazard lookaside buffer, each of which is locally accessible to a processor core of one of the plurality of computing nodes; wherein the instruction is configured to initiate a search for the given pointer in the plurality of hazard lookaside buffer components.

6. The method of claim 5, further comprising:
executing the instruction for determining whether or not an entry for a given pointer resides in one or more of the plurality of hazard lookaside buffer components; wherein said executing comprises broadcasting a bus transaction indicating that the plurality of hazard lookaside buffer components are to be searched for the given pointer; and
detecting, by the plurality of hazard lookaside buffer components, the bus transaction.

7. The method of claim 5, further comprising:
receiving a respective response from one or more of the plurality of hazard lookaside buffer components indicating that an entry for the given pointer resides in the hazard lookaside buffer component; and
refraining from reclaiming memory identified by the given pointer.

8. The method of claim 5, further comprising:
performing, in response to a failure to receiving a response from any one or more of the plurality of hazard lookaside buffer components indicating that an entry for the given pointer resides in the hazard lookaside buffer component, an operation to search for the given pointer in the hazard table;
determining that an entry for the given pointer resides in the hazard table; and
refraining from reclaiming memory identified by the given pointer.

9. The method of claim 5, further comprising:
performing, in response to a failure to receiving a response from any one or more of the plurality of hazard lookaside buffer components indicating that an entry for the given pointer resides in the hazard lookaside buffer component, an operation to search for the given pointer in the hazard table;
determining that no entry for the given pointer resides in the hazard table; and
reclaiming memory identified by the given pointer.

10. A system, comprising:
a plurality of processor cores;
a plurality of hazard lookaside buffer components;
a bus interface;
a shared memory that is accessible by each of the plurality of processor cores over the bus interface; and
a hazard table that is maintained in the shared memory, wherein the hazard table is configured to store information about potentially hazardous pointers, wherein a potentially hazardous pointer identifies memory that cannot be safely reclaimed;
wherein each of the plurality of processor cores is associated with one of the plurality of hazard lookaside buffer components that is locally accessible to the processor core; and
wherein each of the hazard lookaside buffer components is configured to store information about potentially hazardous pointers that have been or are going to be dereferenced by software executing on the processor core to which it is locally accessible and about which information has not yet been written to the hazard table.

11. The system of claim 10, wherein each of the hazard lookaside buffers is shared by, and is locally accessible to, two or more processor cores on the same integrated circuit device.

12. The system of claim 10, wherein each of the hazard lookaside buffers is locally accessible to only a single one of the plurality of processor cores or only to a single thread executing on one of the plurality of processor cores.

13. The system of claim 10,
wherein, during execution of an application on the plurality of processor cores, one of processor cores is configured to issue an instruction to store information about a potentially hazardous pointer to the hazard table; and
wherein execution of the instruction causes an entry comprising information about the potentially hazardous pointer to be written to the hazard lookaside buffer component that is locally accessible to the one of the processor cores.

14. The system of claim 13,
wherein the system further comprises a plurality of store buffer components;
wherein each of the plurality of processor cores is associated with one of the plurality of store buffer components that is locally accessible to the processor core; and
wherein execution of the instruction further causes an entry comprising information about the potentially hazardous pointer to be written to the store buffer component that is locally accessible to the one of the processor cores.

15. A non-transitory, computer-readable storage medium storing program instructions that when executed on one or more processor cores cause the one or more processor codes to implement a multithreaded application;
wherein the multithreaded application comprises a testing instruction that is invoked by an operation to determine whether or not a given shared memory location or block of shared memory can be recycled, wherein the testing instruction is configured to:
determine whether or not a pointer to the given shared memory location or block of shared memory resides in any of a plurality of buffer components that store information about potentially hazardous pointers, each of which is locally accessible to one or more threads executing on one of the one or more processor cores, wherein a potentially hazardous pointer identifies memory that cannot be safely recycled; and
determine, in response to receiving an indication from one of the plurality of buffer components that a pointer to the given shared memory location or block of shared memory resides in the one of the plurality of buffer components, that the given shared memory location or block of shared memory cannot be recycled.

16. The non-transitory, computer-readable storage medium of claim 15,
wherein the testing instruction is further configured to:
determine, in response to failing to receive an indication from any of the plurality of buffer components that a pointer to the given shared memory location or block of shared memory resides in the buffer component, whether or not a pointer to the given shared memory location or block of shared memory resides in a shared hazard table that is accessible to a plurality of threads executing on the one or more processor cores; and
determine, in response to determining that a pointer to the given shared memory location or block of shared memory resides in the shared hazard table, that the given shared memory location or block of shared memory cannot be recycled.

17. The non-transitory, computer-readable storage medium of claim 16,
wherein the testing instruction is further configured to:
determine, in response to determining that no pointer to the given shared memory location or block of shared memory resides in the shared hazard table, that the given shared memory location or block of shared memory can be recycled.

18. The non-transitory, computer-readable storage medium of claim 15,
wherein the multithreaded application comprises:
an instruction that dereferences a pointer to the given shared memory location or block of shared memory; and
an instruction that is configured to store the pointer to one of the plurality of buffer components.

19. The non-transitory, computer-readable storage medium of claim 18,
wherein the testing instruction and the instruction that is configured to store the pointer to one of the plurality of buffer components are implemented in hardware as native instructions of the instruction set architecture of the one or more processor cores.

20. The non-transitory, computer-readable storage medium of claim 15,
wherein the multithreaded application comprises an instruction that atomically performs:
dereferencing a pointer to the given shared memory location or block of shared memory; and
storing the pointer to one of the plurality of buffer components; and
wherein the instruction is implemented in hardware as a native instruction of the instruction set architecture of the one or more processor cores.

* * * * *

UNITED STATES PATENT AND TRADEMARK OFFICE
CERTIFICATE OF CORRECTION

| | | |
|---|---|---|
| PATENT NO. | : 9,785,548 B2 | Page 1 of 1 |
| APPLICATION NO. | : 14/946625 | |
| DATED | : October 10, 2017 | |
| INVENTOR(S) | : Kogan et al. | |

It is certified that error appears in the above-identified patent and that said Letters Patent is hereby corrected as shown below:

In the Specification

Column 8, Line 35, delete "fill," and insert -- full, --, therefor.

Column 12, Line 59, delete "harzardRead2" and insert -- hazardRead2 --, therefor.

Signed and Sealed this
Nineteenth Day of June, 2018

Andrei Iancu
*Director of the United States Patent and Trademark Office*